United States Patent
Ortmann

(10) Patent No.: US 11,019,973 B2
(45) Date of Patent: Jun. 1, 2021

(54) METHOD FOR OPERATING A SELF-TRAVELING FLOOR TREATMENT APPARATUS

(71) Applicant: Vorwerk & Co. Interholding GmbH, Wuppertal (DE)

(72) Inventor: Roman Ortmann, Huerth (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 387 days.

(21) Appl. No.: 15/918,062

(22) Filed: Mar. 12, 2018

(65) Prior Publication Data

US 2018/0263451 A1 Sep. 20, 2018

(30) Foreign Application Priority Data

Mar. 15, 2017 (DE) .................... 10 2017 105 540.1

(51) Int. Cl.
| | |
|---|---|
| *A47L 9/30* | (2006.01) |
| *G05D 1/02* | (2020.01) |
| *G05D 1/00* | (2006.01) |
| *B60Q 1/50* | (2006.01) |
| *A47L 9/28* | (2006.01) |
| *G07C 5/08* | (2006.01) |

(52) U.S. Cl.
CPC ............. *A47L 9/30* (2013.01); *A47L 9/2857* (2013.01); *A47L 9/2884* (2013.01); *A47L 9/2894* (2013.01); *B60Q 1/50* (2013.01); *G05D 1/0055* (2013.01); *G05D 1/0274* (2013.01); *G07C 5/0808* (2013.01); *G07C 5/0825* (2013.01); *A47L 2201/04* (2013.01); *B60Q 2400/50* (2013.01); *G05D 2201/0215* (2013.01)

(58) Field of Classification Search
None
See application file for complete search history.

(56) References Cited

U.S. PATENT DOCUMENTS

| | | | |
|---|---|---|---|
| 9,902,061 B1 * | 2/2018 | Kuffner ................ | B25J 9/163 |
| 2009/0013922 A1 * | 1/2009 | Lin ...................... | B60Q 1/38 |
| | | | 116/28 R |

(Continued)

OTHER PUBLICATIONS

Takuya Sasai, Development of a Guide Robot Interacting with the User using Information Projection, Aug. 2011, IEEE Internation Conference on Mechatronics and Automation, https://ieeexplore.ieee.org/abstract/document/5985849 (Year: 2011).*

*Primary Examiner* — David P. Merlino
(74) *Attorney, Agent, or Firm* — Collard & Roe, P.C.

(57) ABSTRACT

A method for operating a floor treatment apparatus that travels by itself within an environment, wherein a control and evaluation unit monitors the operating status of the floor treatment apparatus, detects an error condition of the floor treatment apparatus and initiates the output of an information signal in case an error condition occurs. In order to locate the floor treatment apparatus in a particularly simple and convenient fashion during an error condition, it is proposed that an optical signal output device of the floor treatment apparatus emits an optical information signal, which generates a light projection that represents a directional indicator, wherein the directional indicator points from a projection site within the environment in the direction of the current position of the floor treatment apparatus.

8 Claims, 5 Drawing Sheets

(56) References Cited

U.S. PATENT DOCUMENTS

| | | | |
|---|---|---|---|
| 2014/0028980 A1* | 1/2014 | Othmer | G01C 21/365 |
| | | | 353/14 |
| 2015/0042485 A1* | 2/2015 | Suessemilch | B25J 9/1674 |
| | | | 340/815.4 |
| 2016/0046289 A1* | 2/2016 | Elbs | B60Q 1/50 |
| | | | 701/49 |
| 2017/0080850 A1* | 3/2017 | Drexler | H05B 45/10 |
| 2017/0225321 A1* | 8/2017 | Deyle | B25J 9/1679 |
| 2018/0007341 A1* | 1/2018 | Okuley | H04N 9/3179 |
| 2018/0050634 A1* | 2/2018 | White | A47L 9/2805 |
| 2020/0150655 A1* | 5/2020 | Artes | G05D 1/0016 |

* cited by examiner

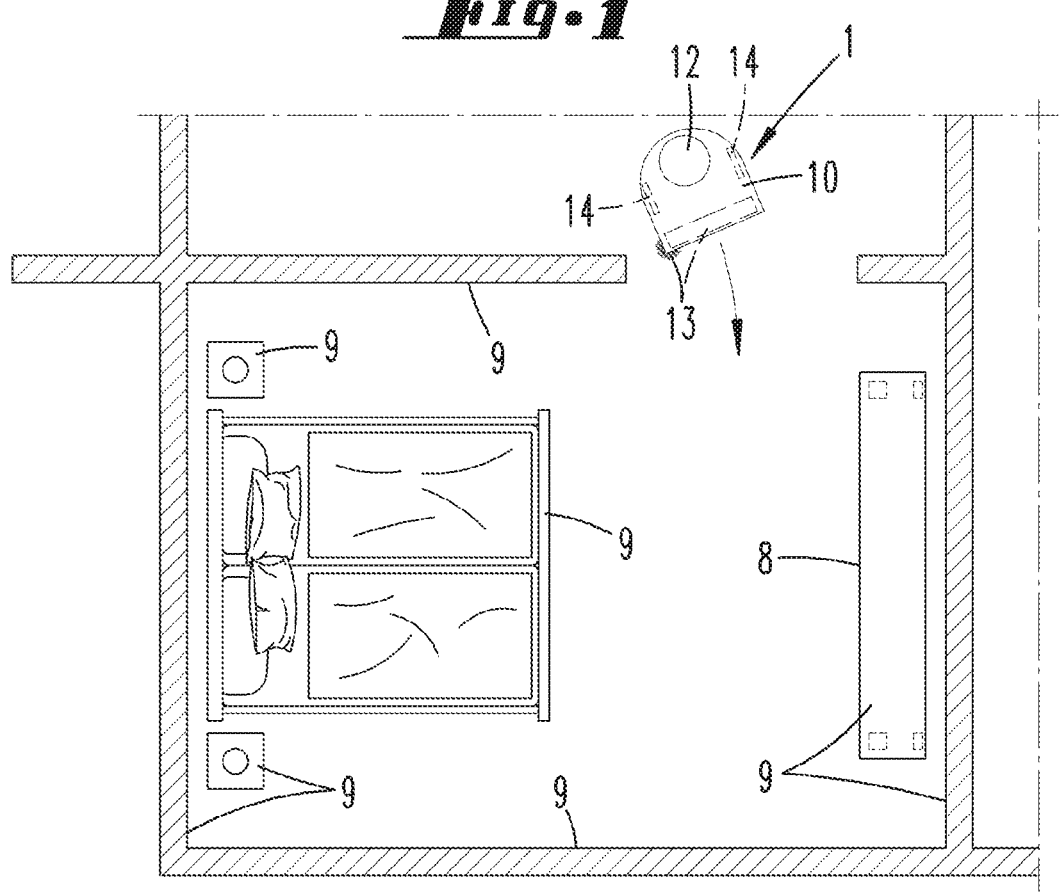
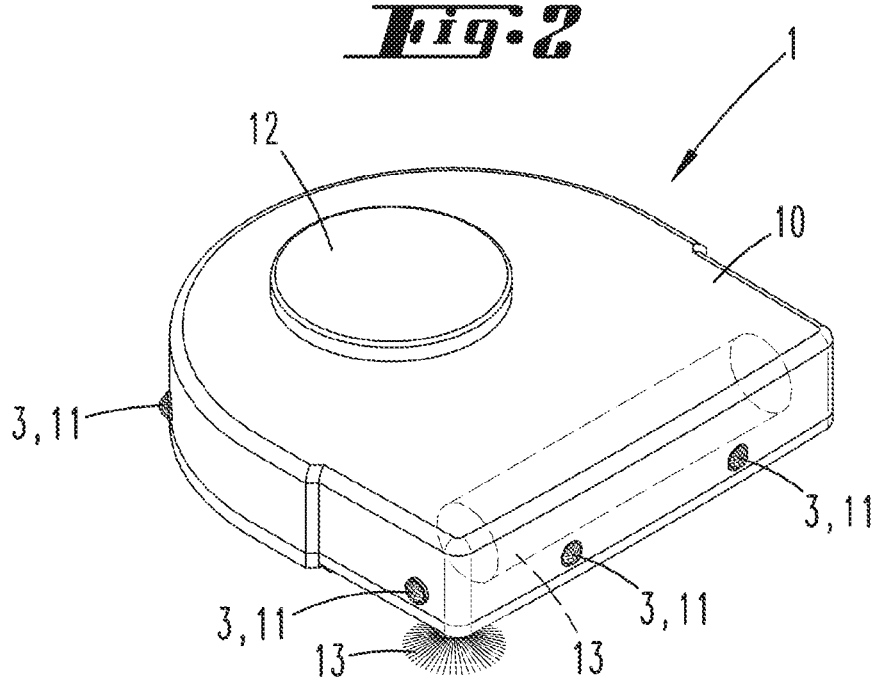

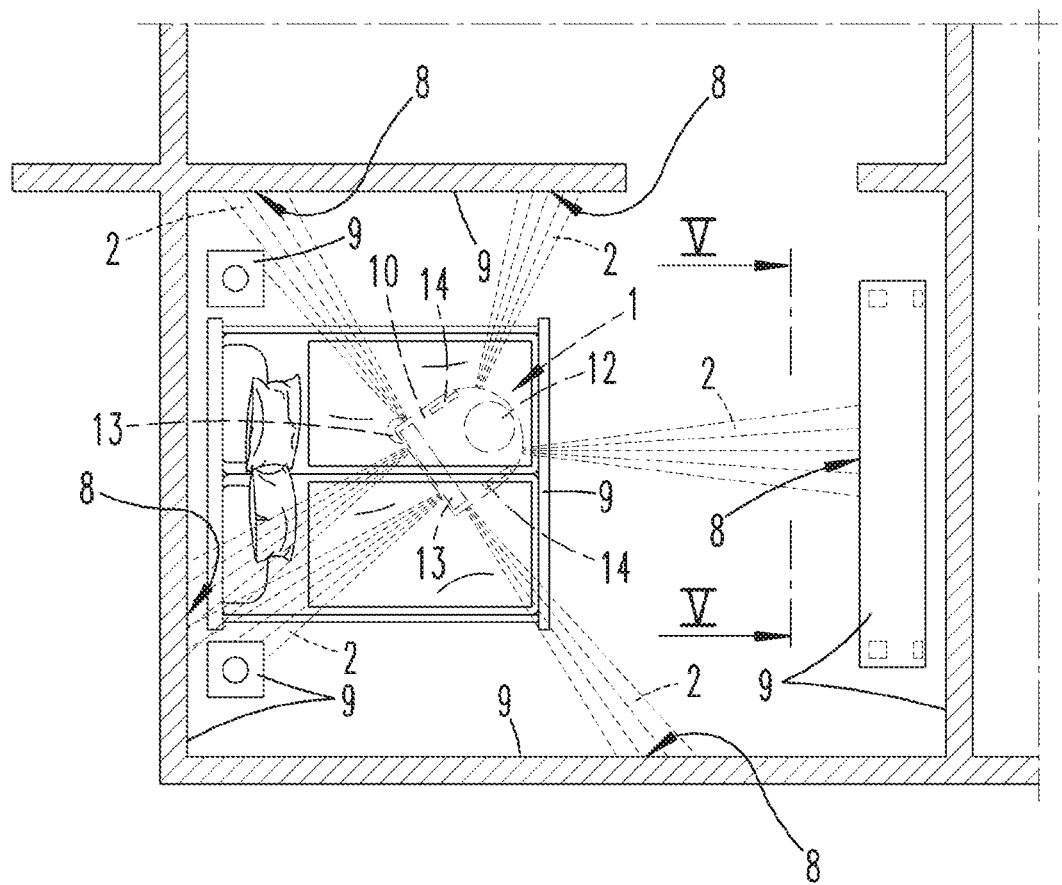

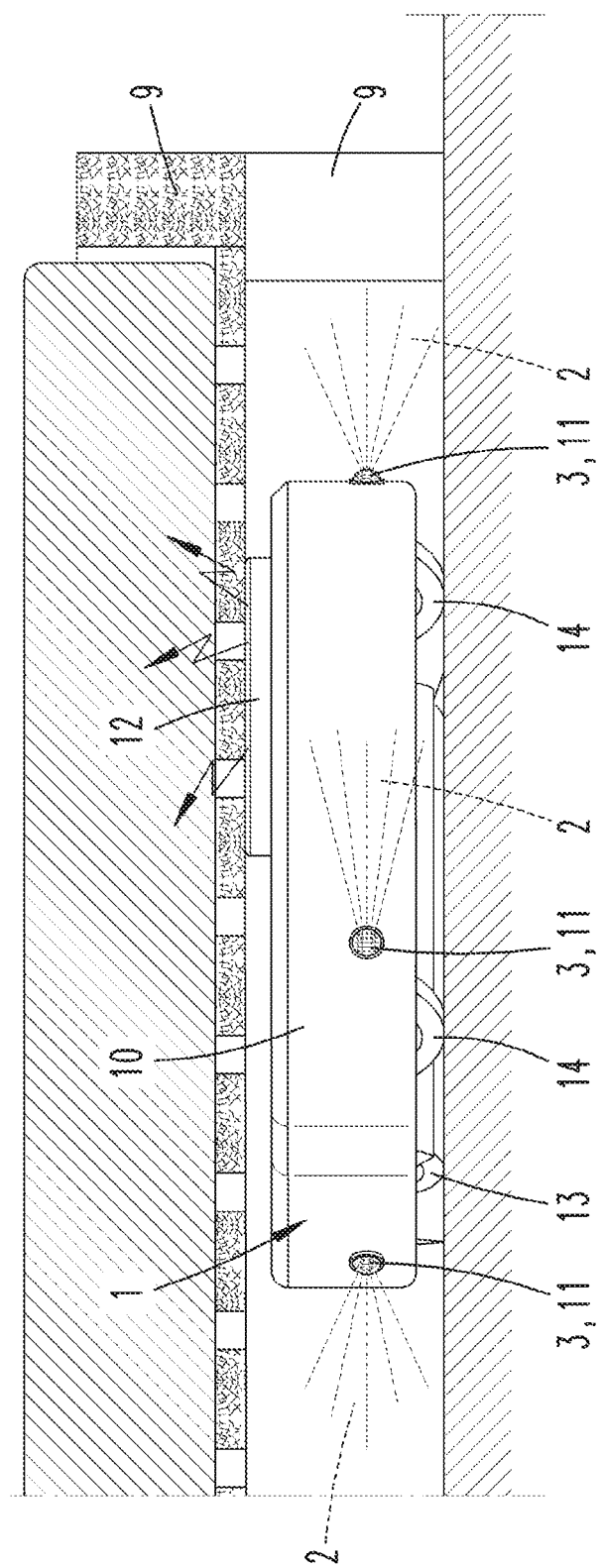

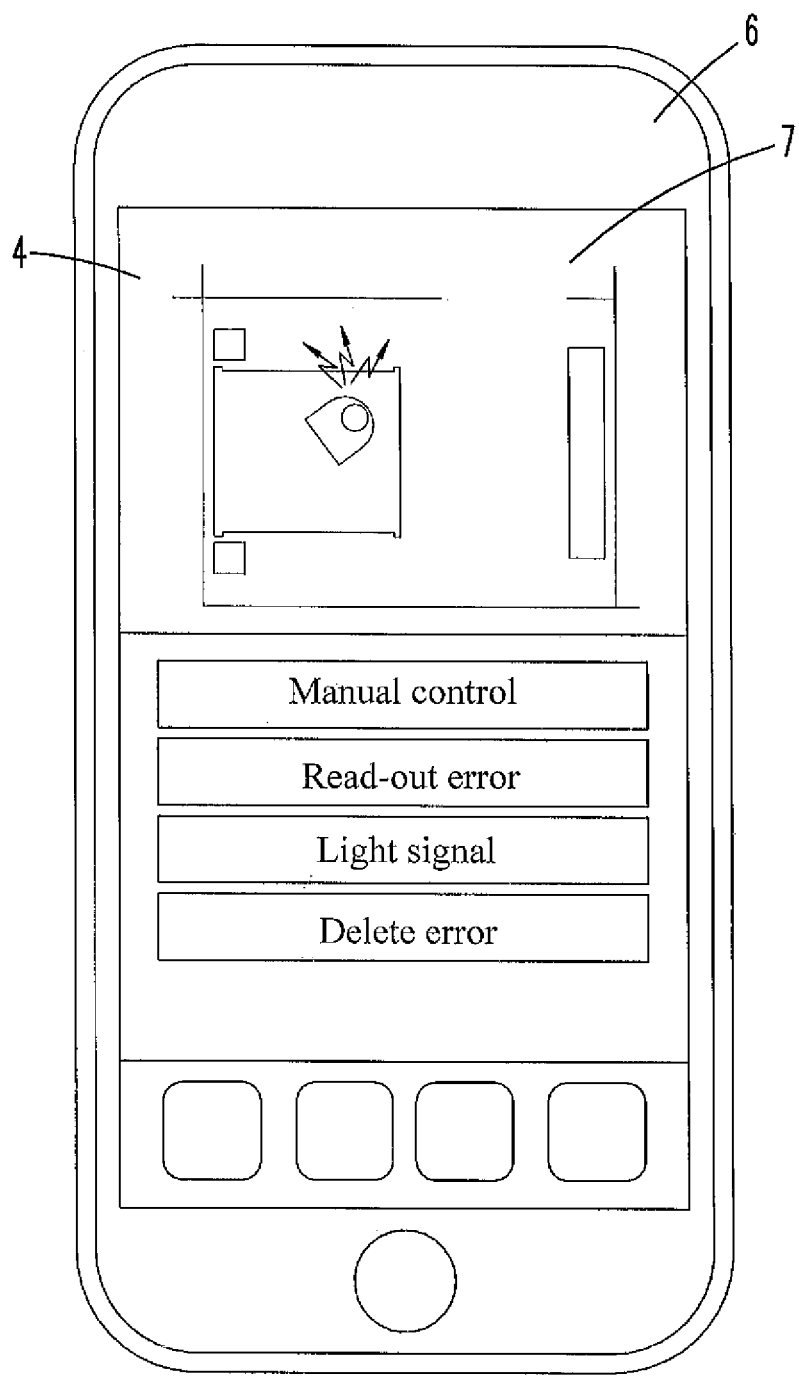

METHOD FOR OPERATING A SELF-TRAVELING FLOOR TREATMENT APPARATUS

CROSS REFERENCE TO RELATED APPLICATIONS

Applicant claims priority under 35 U.S.C. § 119 of German Application No. 10 2017 105 540.1 filed on Mar. 15, 2017, the disclosure of which is incorporated by reference.

TECHNICAL FIELD

The invention pertains to a method for operating a floor treatment apparatus that travels by itself within an environment, wherein a control and evaluation unit monitors the operating status of the floor treatment apparatus, detects an error condition of the floor treatment apparatus and initiates the output of an information signal in case an error condition occurs.

The invention furthermore pertains to a floor treatment apparatus that travels by itself within an environment and features a control and evaluation unit, which is designed for monitoring an operating status of the floor treatment apparatus, detecting an error condition of the floor treatment apparatus and initiating the output of an information signal in case an error condition occurs.

PRIOR ART

Methods and floor treatment apparatuses of the above-described type are sufficiently known from the prior art.

Known floor treatment apparatuses, for example in the form of vacuum robots and/or wiping robots, are capable of traveling by themselves within an environment. For this purpose, these robots feature a navigation and self-localization unit, by means of which an environment map of the floor treatment apparatus can be generated and a position of the floor treatment apparatus can be detected. The navigation and self-localization unit reads out measuring data, which the floor treatment apparatus has recorded within the environment. For example, the floor treatment apparatus may feature a distance sensor and an odometry sensor that respectively detect distances from obstacles and distances traveled. The floor treatment apparatus can orient itself within the environment based on the generated environment map, as well as currently recorded measuring data.

As soon as an error condition occurs, i.e. when the floor treatment apparatus has become jammed, e.g., between obstacles, a rechargeable battery has reached an excessively low charge condition or a software crash, e.g., of the navigation and self-localization software has been detected, an information signal for a user of the floor treatment apparatus is output in order to inform the user of the error condition. The information signal is usually a sound sequence that draws the user's attention to the floor treatment apparatus. Based on this acoustic information signal, the user is basically capable of locating the floor treatment apparatus, for example, in an invisible position such as underneath a bed, a cabinet or the like.

However, the output of sound sequences has the disadvantage that it can have annoying effects on the user and/or other person in the environment of the floor treatment apparatus, particularly if it takes place periodically. It is also difficult to locate the floor treatment apparatus if the sound sequences are in fact emitted periodically, but spaced apart by relatively long time intervals. Last but not least, it is difficult for hearing-impaired or even deaf persons to take notice of the information signal.

SUMMARY OF THE INVENTION

Based on the above-described prior art, the invention therefore aims to respectively develop a floor treatment apparatus and a method for its operation, by means of which a user is informed of an error condition in an alternative way. The invention particularly aims to make it easier to locate the floor treatment apparatus in case an error condition occurs.

In order to attain the above-defined objective, the invention initially proposes a method for operating a self-traveling floor treatment apparatus, in which an optical signal output device of the floor treatment apparatus emits an optical information signal, which generates a light projection that represents a directional indicator, wherein the directional indicator points from a projection site within the environment in the direction of the current position of the floor treatment apparatus.

According to the invention, an error condition of the floor treatment apparatus is no longer announced by means of an acoustic signal such as a sound sequence, but rather an optical information signal that is projected on a projection site within the environment of the floor treatment apparatus by the signal output device. In this way, hearing-impaired or deaf persons can also very easily locate the current position of the floor treatment apparatus. If the error condition prevents the floor treatment apparatus, for example, from traveling onward, the user can trace back the optical information signal and thereby reach the position of the floor treatment apparatus. The optical information signal contains a directional indicator, based on which the user can obtain information on the direction in space, in which the floor treatment apparatus is located. For example, the directional indicator may include the display of an arrow that points from the projection site at the floor treatment apparatus. Consequently, the user merely has to look in the direction indicated by the arrow and can thereby also locate the floor treatment apparatus, e.g., underneath a bad, a cabinet or the like. For example, the projection site, on which the information signal is projected, may be a section of a floor area, a front of a piece of furniture, a section of a wall or the like.

It is furthermore proposed that the information signal is emitted when the control and evaluation unit detects that the floor treatment apparatus is jammed, impeded and/or blocked, that a charge condition of a rechargeable battery has dropped below a defined minimum charge condition and/or a faulty software status. These error conditions impede or prevent the floor treatment apparatus from traveling onward within the environment or at least an optimal treatment success of the floor treatment apparatus. These error conditions on the one hand include conditions, in which the floor treatment apparatus has become jammed underneath a piece of furniture such as a bed, a sofa, a dresser or the like and is no longer capable of dislodging itself. On the other hand, an error condition may also concern a situation, in which a drive unit and/or a driven wheel of the floor treatment apparatus is blocked and therefore prevents or at least impedes a progressive motion. Furthermore, the floor treatment apparatus may also be blocked by obstacles that in fact do not cause the floor treatment apparatus to become jammed, but impede its onward motion, namely in such a way that the floor treatment apparatus cannot navigate itself out of this situation. These error conditions may make it necessary for the user to release the floor treatment apparatus from the corresponding situation. For example, other error conditions are excessively low charge conditions of a rechargeable battery of the floor treatment apparatus or an error in the operating software of the floor treatment apparatus, which prevents a progressive motion and/or proper operation of the floor treatment apparatus. The preceding list should not be interpreted in a conclusive sense. In fact, an intervention of the user may also be required or at least suggested under other conceivable error conditions.

Furthermore, the signal output device may automatically emit the information signal immediately after the detection of an error condition. According to this embodiment, an information signal is immediately emitted by the signal output device once the control and evaluation unit of the floor treatment apparatus detects an error condition. The user of the floor treatment apparatus does not have to take any measures in order to request the information signal. In fact, the information signal is automatically projected into the environment of the floor treatment apparatus, for example on a floor, a wall or a piece of furniture, such that a user, who is present in this environment, notices the information signal and the user's attention is drawn to the error condition of the floor treatment apparatus. The user can then determine the position of the floor treatment apparatus based on the directional indicator contained in the information signal, locate the floor treatment apparatus and rectify the error condition.

It is alternatively proposed that, in case of an error condition, the control and evaluation unit transmits a message concerning the error condition to an external device that is communicatively linked to the floor treatment apparatus, wherein the user manually initiates the output of an information signal by the signal output device of the floor treatment apparatus with the aid of the external device. According to this embodiment, the information signal is not automatically emitted as soon as an error condition of the floor treatment apparatus is detected, but rather only if the user of the floor treatment apparatus issues a specific request to this effect. If an error condition occurs, the user is initially informed of the error condition by means of a message. The user can then decide whether or not an optical information signal should be emitted. The message concerning the error condition is advantageously transmitted to a mobile device of the user such as a mobile telephone, a tablet computer, a laptop or the like. However, the information signal may alternatively also be transmitted to a local PC, a remote server or the like. The signal output device is therefore only operated upon a specific request by the user. This makes it possible to save energy for unnecessary or unwanted light projections. The external device of the user may feature an application that is communicatively linked to the floor treatment apparatus and notifies the user of an error condition. In this context, it would be conceivable that the message not only contains information on the occurrence of an error condition, but also additional information such as information on the type of error condition, a suggestion for rectifying the error condition, information on the time at which the error condition occurred and the like. The user can in turn transmit a signal, which initiates the output of an information signal, to the floor treatment apparatus by means of the application of the external device such that the signal output device of the floor treatment apparatus only projects an information signal into the environment when the user is ready to search for the floor treatment apparatus and/or located in the environment of the floor treatment apparatus.

It is furthermore proposed that the control and evaluation unit detects a current position and orientation of the floor treatment apparatus based on an environment map, evaluates environment information in the region of the floor treatment apparatus and projects the optical information signal on a projection site of the environment, which with respect to a size and direction of the light projection is free of obstacles and/or visible from a bird's eye view. This embodiment is particularly suitable in connection with a navigation and self-localization unit of the floor treatment apparatus, which generates an environment map of the environment of the floor treatment apparatus. For this purpose, the floor treatment apparatus may feature one or multiple sensors, for example, in the form of a distance measuring device and/or odometric measuring device. An environment map of the environment can be generated based on the measured distances from room boundaries, obstacles and the like, wherein the positions of obstacles and/or room boundaries are recorded in this environment map. The control and evaluation unit can access this map, which is generated by the floor treatment apparatus itself, or also an environment map transmitted to the floor treatment apparatus by another device in order to determine a suitable projection site for the projection of the optical information signal. To this end, the control and evaluation unit selects a projection site that is free of obstacles and/or visible to the user of the floor treatment apparatus. In this context, "free of obstacles" furthermore refers to a section of a floor, a wall, an obstacle or the like, which on the one hand is sufficiently large for projecting the optical information signal in a sufficiently visible fashion and on the other hand not covered by other obstacles such as a table, chair or the like standing on a section of the floor. The projection site should be visible from a bird's eye view such that a user standing in the environment can see the projection site and therefore also recognize the directional indicator.

It is particularly proposed that the control and evaluation unit selects one signal output device from a plurality of signal output devices of the floor treatment apparatus, wherein the selected signal output device lies closest to the projection site. The floor treatment apparatus features a plurality of signal output devices that are arranged, for example, along a circumference of the floor treatment apparatus. The control and evaluation unit selects one or even multiple signal output devices, which respectively lie closest to an optimal projection site or are most suitable for projecting the information signal on this projection site, from the plurality of signal output devices. For this purpose, the control and evaluation unit has information on the positions and orientations of the signal output devices of the floor treatment apparatus, as well as on the current position and the current orientation of the floor treatment apparatus within the environment, such that a suitable projection site for projecting the information signal containing the directional indicator on the one hand and the currently most suitable signal output device, i.e. the optimally positioned signal output device, for the projection on the other hand can be determined.

It is furthermore proposed that the signal output device is displaced relative to the housing of the floor treatment apparatus and/or that the information signal emitted by a light source of the signal output device is deflected by means of an optical deflection arrangement in order to project the information signal on the projection site. For example, the signal output device may be arranged on an adjustable bracket on the housing of the floor treatment apparatus in order to project the information signal on the desired projection site of the environment. Alternatively, the signal output device or a light source thereof may be rigidly connected to the housing of the floor treatment apparatus, but the signal output device or the light source is respectively combined with an optical deflection arrangement such as a pivotable mirror, a prism or the like. The deflection arrangement deflects the information signal originating from the light source of the signal output device to the desired projection site.

In addition to the above-described method for operating a floor treatment apparatus, the invention furthermore proposes a floor treatment apparatus that travels by itself within an environment and features a control and evaluation unit, wherein the control and evaluation unit is designed for monitoring the operating status of the floor treatment apparatus, detecting an error condition of the floor treatment apparatus and initiating the output of an information signal in case an error condition occurs, wherein the floor treatment apparatus features an optical signal output device designed for emitting an optical information signal, which generates a light projection that represents a directional indicator, and wherein the directional indicator points from a projection site within the environment in the direction of the current position of the floor treatment apparatus.

The proposed floor treatment apparatus is designed for carrying out an above-described method, in which an information signal that contains a directional indicator pointing to the floor treatment apparatus is projected on a projection site. For this purpose, the floor treatment apparatus features an optical signal output device that usually comprises at least one light source such as an LED or a laser. The signal output device is designed for respectively projecting a light beam or a light cone on the projection site in such a way that the directional indicator contained in the optical information signal can be recognized by the user of the floor treatment apparatus. While looking at the light projection, the user receives information on the direction, in which the current position of the floor treatment apparatus is located. For example, the directional indicator is an arrow that points from the projection site in the direction of the floor treatment apparatus, for example underneath a piece of furniture, in a section of the environment that is currently not visible to the user or the like.

It is particularly proposed that the signal output device features a plurality of light sources and/or that the signal output device features a light source with a variable diaphragm. In the first case, the signal output device may feature, for example, an LED array, the LEDs of which can be activated in order to display a directional indicator. The information signal generated by the signal output device can then be focused, collimated and/or deflected on the desired projection site by means of optical elements such that the information signal with the directional indicator contained therein becomes recognizable for the user of the floor treatment apparatus. The signal output device may alternatively feature only a single light source, to which a variable diaphragm is assigned in order to respectively display different information signals and directional indicators contained therein. For example, the diaphragm generates the outline of an arrow within the information signal projected on the projection site.

It is furthermore proposed that the signal output device can be displaced relative to a housing of the floor treatment apparatus and/or that the signal output device features an optical deflection arrangement, which can be displaced relative to the housing, in order to deflect the emitted information signal on the projection site. In both instances, the signal output device is designed for projecting the information signal on different projection sites by respectively displacing, for example pivoting, the signal output device or the deflection arrangement relative to the housing of the floor treatment apparatus. The signal output device may be mounted, for example, on a movable bracket of the floor treatment apparatus, wherein the bracket can be advantageously displaced in a motor-driven fashion and activated by means of the control and evaluation unit. Due to the displacement of the bracket, the information signal can be projected on different projection sites. Furthermore, a light source of the signal output device may, for example, also be immovably mounted on the housing of the floor treatment apparatus and used in combination with a displaceable deflection arrangement, which projects the information signal emitted by the light source on the desired projection site. The displaceable deflection arrangement may consist, for example, of a displaceable optical element such as a mirror, a prism or the like.

Furthermore, the characteristics and advantages proposed above with reference to the method also apply to the inventive floor treatment apparatus. The floor treatment apparatus may particularly feature a navigation and self-localization unit that generates an environment map of the environment. The control and evaluation unit can select the optimal projection site in the environment map and, if applicable, additionally select one of multiple potential signal output devices, which is suitable for projecting the information signal on the desired projection site.

The invention furthermore proposes a set consisting of a floor treatment apparatus and an external device of the user of the floor treatment apparatus, wherein the floor treatment apparatus and the external device are communicatively linked in such a way that the control and evaluation unit of the floor treatment apparatus transmits a message concerning an error condition to the external device, wherein the message is displayed, for example, on a screen of the external device, and wherein the user can manually initiate the output of an information signal by the signal output device of the floor treatment apparatus with the aid of the external device. The external device therefore serves as a remote control for the floor treatment apparatus. The set consisting of the floor treatment apparatus and the external device is designed in such a way that the user can also locate the floor treatment apparatus and rectify an error condition if the floor treatment apparatus is currently not visible from the position of the user.

BRIEF DESCRIPTION OF THE DRAWINGS

The invention is described in greater detail below with reference to exemplary embodiments. In the drawings:

FIG. 1 shows an inventive floor treatment apparatus within an environment with a plurality of obstacles, FIG. 2 shows a perspective view of the floor treatment apparatus, FIG. 3 shows the environment according to FIG. 1 with the floor treatment apparatus as an error condition occurs, FIG. 4 shows a side view of the floor treatment apparatus during an error condition, FIG. 6 shows an external device, on which an environment map is displayed during an error condition of the floor treatment apparatus.

DESCRIPTION OF THE EMBODIMENTS

Figure 5:
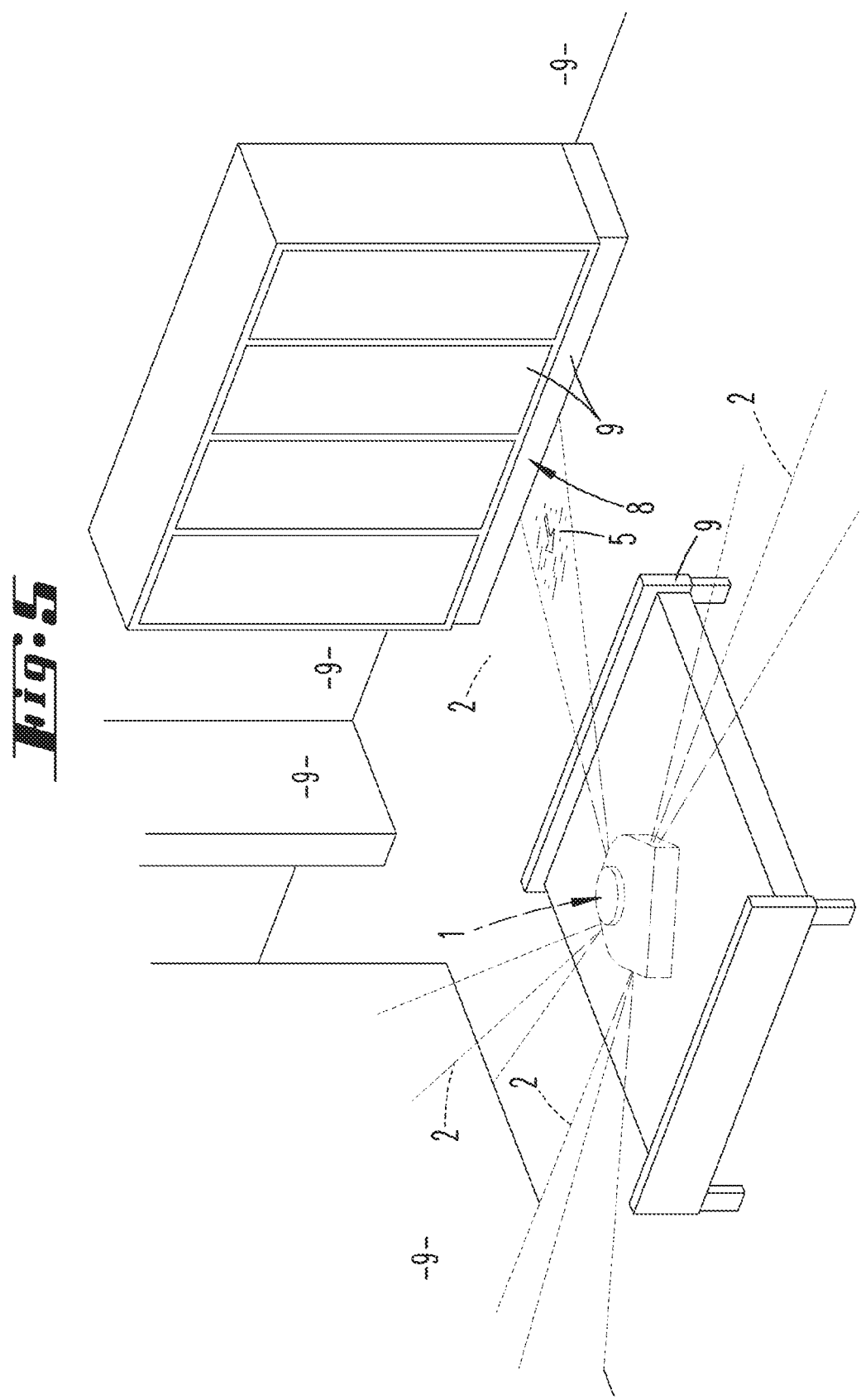
FIG. 5 shows a section of the environment with a light projection representing a directional indicator.

FIG. 1 shows an environment, which in this case represents a section of a residence. A floor treatment apparatus 1, which in this case is realized, for example, in the form of a self-traveling vacuum robot, is located within the environment. The floor treatment apparatus 1 features two cleaning elements 13, namely a bristle roller, which is arranged underneath a housing 10 of the floor treatment apparatus 1, and a lateral brush, which is arranged in a corner region of the housing 10 and makes it possible, in particular, to clean transition areas between a floor and a wall. The floor treatment apparatus 1 furthermore features wheels 14, which are motor-driven and therefore serve for the progressive motion of the floor treatment apparatus 1 within the environment.

The environment contains a plurality of obstacles 9, which in this case consist, for example, of room boundaries, a cabinet, a bed and two nightstands. At least some of the obstacles 9 are designed in such a way that the floor treatment apparatus 1 can travel thereunder during its progressive motion.

The floor treatment apparatus 1 features a (not-shown) navigation and self-localization unit that reads out data from a distance measuring device 12 of the floor treatment apparatus 1, which in this case comprises, for example, a triangulation measuring device. Distances from the obstacles 9 are determined by means of the distance measuring device 12 and combined into an environment map 7 (see FIG. 6). The environment map 7 contains the obstacles 9, as well as the current position of the floor treatment apparatus 1. The environment map 7 is continuously updated during the progressive motion of the floor treatment apparatus 1. The navigation and self-localization unit is communicatively linked to a control and evaluation unit of the floor treatment apparatus 1, which monitors the operating status of the floor treatment apparatus 1, can detect an error condition of the floor treatment apparatus 1 and, in case of an error condition, initiate the output of an information signal 2, by means of which a user of the floor treatment apparatus 1 is informed of the error condition.

FIG. 2 shows the floor treatment apparatus 1 in the form of a perspective view from outside. The floor treatment apparatus 1 features a plurality of signal output devices 3, which are arranged along the circumference of the housing 10. In this case, each signal output device 3 comprises a plurality of light sources 11 that are arranged adjacent to and underneath one another in the form of an array. The light sources 11 of the respective signal output device 3 can be activated by means of the control and evaluation unit in such a way that certain light sources 11 of the respective signal output device 3 emit a light beam and the complete information signal 2 emitted by the array is generated in the form of a graphic representation like on a commercially available LED television. In this case, an optical element, which focuses the optical information signal 2 and makes information contained therein legible for the user, may be additionally assigned to the light sources 11. Although not illustrated in FIG. 2, the floor treatment apparatus 1 may additionally feature a displaceable bracket for the signal output device 3 such that the emitting direction of the information signal 2 can be varied.

FIG. 3 shows the environment illustrated in FIG. 1, in which the floor treatment apparatus 1 has become jammed underneath an obstacle 9, in this case a bed. The jamming occurred, for example, due to a slatted frame that is suspended underneath the bed and changes the height difference between the floor treatment apparatus 1 and the bed. In this situation, the control and evaluation unit of the floor treatment apparatus 1 detects an error condition of the floor treatment apparatus 1, namely that the floor treatment apparatus 1 has become jammed and no longer can carry out a progressive motion under its own power. In order to inform the user of the floor treatment apparatus 1 of this error condition and to simultaneously provide the user with information on the current position of the floor treatment apparatus 1, the signal output devices 3 of the floor treatment apparatus 1 emit information signals 2 at several projection sites 8 of the environment, in this case at obstacles 9 such as, for example, a cabinet and room boundaries (walls) or at a floor area. The information signals 2 originating from the floor treatment apparatus 1 extend outside the outline of the bed that covers the floor treatment apparatus 1. In this way, the user's attention can be drawn to the information signal 2.

FIG. 4 shows the floor treatment apparatus 1 underneath the obstacle 9, namely underneath the bed, wherein the housing 10 is in contact with the obstacle 9 and the occurring frictional force prevents the floor treatment apparatus from traveling onward under its own motive power. Consequently, an error condition of the floor treatment apparatus 1 has occurred due to jamming underneath the obstacle 9. After the control and evaluation unit of the floor treatment apparatus 1 has detected the error condition, for example, due to the fact that no progressive motion of the floor treatment apparatus 1 is registered by the distance measuring device 12 when a motive power is exerted upon the wheels 14, the control and evaluation unit prompts the signal output devices 3 to respectively project an information signal 2 into the environment.

FIG. 5 basically shows an environment of the type already illustrated in FIG. 3, wherein an information signal 2 is projected on a floor in this case. Consequently, a projection site 8, on which the information signal 2 is respectively displayed or made visible, is created on the floor. The information signal 2 contains a directional indicator 5, in this case an arrow that points in the direction of the current position of the floor treatment apparatus 1 underneath the bed. Alternatively, such an information signal 2 could also be projected on an obstacle 9 in the environment instead of on a floor or a floor area. The arrow forming the directional indicator 5 results from the projection of a plurality of light beams, which were emitted from an array of the signal output device 3 that contains multiple light sources 11. Different images, particularly directional indicators, can be displayed depending on the respective activity or inactivity of individual light sources 11 within the array. Furthermore, the information signal 2 may also have a special color, blink within certain time intervals or the like.

A projection device comparable to a data projector may also be provided on the floor treatment apparatus, particularly for a projection on an obstacle 9, i.e. on a vertical or essentially vertical surface, wherein automatic focusing is preferably also realized. Alternatively, an image, which is correspondingly assembled of image lines, could also be projected by means of a laser diode in the range of a visible wavelength within a plurality of lines, preferably horizontally oriented lines that are arranged vertically underneath one another.

FIG. 6 shows an external device 6 that can be used in combination with the floor treatment apparatus 1. In this case, the external device 6 consists, for example, of a mobile telephone with a screen 4, on which an environment map 7 generated by the floor treatment apparatus 1 is displayed. An application installed on the external device 6 receives messages concerning error conditions from the floor treatment apparatus 1 and offers the user assistance in locating the floor treatment apparatus 1 and/or in rectifying the error condition.

For example, the floor treatment apparatus 1 can be used in connection with the external device 6 in such a way that, in case of an error condition of the floor treatment apparatus 1, the user initially receives a message concerning the occurrence of the error condition on the external device 6. An environment map 7 of the environment of the floor treatment apparatus 1 is displayed on the screen 4 of the external device 6, wherein the current position of the floor treatment apparatus 1 is shown, among other things, in said environment map. Furthermore, the application installed on the external device 6 provides a selection of multiple options that make it possible to react to the error condition. On the one hand, the user can remotely control the floor treatment apparatus 1 under the menu item "Manual Control" in such a way that the floor treatment apparatus 1 is navigated out of the jammed position, for example by means of a joystick control. If applicable, other driven elements such as the rotating cleaning elements 13 may also be activated in order to rectify the error condition by dislodging the floor treatment apparatus 1 underneath the obstacle 9. The user can furthermore select the menu item "Light Signal." This initiates the output of an information signal 2 by one or more signal output devices 3 of the floor treatment apparatus 1. The information signal 2 or the directional indicator 5 contained therein respectively points the user toward the position of the floor treatment apparatus 1 such that the user can release the floor treatment apparatus 1 from this situation. After the floor treatment apparatus 1 has been released by the user, the user can push the button "Delete Error" on the external device 6 such that the operation of the floor treatment apparatus 1 can be started anew.

In order to locate the floor treatment apparatus 1 in a position underneath the obstacle 9, which is not visible to the user, the user follows the directional indicator 5, which is contained in the information signal 2 and points from the projection site 8 underneath the obstacle 9 (bed) jamming the floor treatment apparatus 1.

LIST OF REFERENCE SYMBOLS

1 Floor treatment apparatus
2 Information signal
3 Signal output device
4 Screen
5 Directional indicator
6 External device
7 Environment map
8 Projection site
9 Obstacle
10 Housing
11 Light source
12 Distance measuring device
13 Cleaning element
14 Wheel

The invention claimed is:

1. A method for operating a floor treatment apparatus (1) that travels by itself within an environment, comprising:
monitoring an operating status of the floor treatment apparatus (1) with a control and evaluation unit of the floor treatment apparatus,
detecting an error condition of the floor treatment apparatus (1) with the control and evaluation unit,
and initiating the output of an optical information signal (2) in response to the error condition occurring, wherein an optical signal output device (3) of the floor treatment apparatus (1) emits the optical information signal (2), which generates a light projection that represents a directional indicator (5), wherein the light projection is projected on a projection site (8) within the environment of a current position of the floor treatment apparatus (1), and wherein the directional indicator (5) points from the projection site (8) within the environment in a direction of the current position of the floor treatment apparatus (1),
wherein the control and evaluation unit detects the current position and orientation of the floor treatment apparatus (1) based on an environment map (7), evaluates environment information in the environment map and projects the optical information signal (2) onto the projection site (8) of the environment, which with respect to a size and direction of the light projection is free of obstacles (9) and visible from a bird's eye view, wherein the control and evaluation unit accesses the environment map in order to determine as the projection site a section of a floor, a section of a wall or a section of an obstacle that is sufficiently large for projecting the light projection so that it is visible and is not covered by an object in between the floor treatment apparatus and the projection site.

2. The method according to claim 1, wherein the optical information signal (2) is emitted when the control and evaluation unit detects that the floor treatment apparatus (1) is jammed, impeded and/or blocked, that a charge condition of a rechargeable battery has dropped below a defined minimum charge condition and/or a faulty software status.

3. The method according to claim 1, wherein, in response to the error condition, the control and evaluation unit transmits a message concerning the error condition to an external device (6) that is communicatively linked to the floor treatment apparatus (1).

4. The method according to claim 1, wherein the control and evaluation unit selects one signal output device (3) from a plurality of signal output devices (3) as the optical signal output device, wherein the selected signal output device (3) lies closest to the projection site (8).

5. The method according to claim 1, wherein the optical signal output device (3) is displaced relative to a housing (10) of the floor treatment apparatus (1) and/or the optical information signal (2) emitted by a light source (11) of the optical signal output device (3) is deflected by means of an optical deflection arrangement in order to project the optical information signal (2) onto the projection site (8).

6. A floor treatment apparatus (1) that travels by itself within an environment and features a control and evaluation unit, which is configured for monitoring an operating status of the floor treatment apparatus (1), detecting an error condition of the floor treatment apparatus (1) and initiating output of an optical information signal (2) in response to the error condition occurring, wherein the floor treatment apparatus (1) features an optical signal output device (3) configured for emitting the optical information signal (2), the optical signal output device comprising at least one light source which generates a light projection that represents a directional indicator (5), wherein the light projection is projected on a projection site (8) within the environment of a current position of the floor treatment apparatus (1), and wherein the directional indicator (5) points from the projection site (8) within the environment in a direction of the current position of the floor treatment apparatus (1),
wherein the control and evaluation unit is configured to detect the current position and orientation of the floor treatment apparatus (1) based on an environment map (7), evaluate environment information in the environment map and project the optical information signal (2) onto the projection site (8) of the environment, which with respect to a size and direction of the light projection is free of obstacles (9) and visible from a bird's eye view, wherein the control and evaluation unit is configured to access the environment map in order to determine the projection site a section of a floor, a section of a wall or a section of an obstacle that is sufficiently large for the light projection so that the optical information is visible and is not covered by an object in between the floor treatment apparatus and the projection site.

7. The floor treatment apparatus (1) according to claim 6, wherein the optical signal output device (3) features a plurality of light sources (11) and/or a light source (11) with a variable diaphragm.

8. The floor treatment apparatus (1) according to claim 6, wherein the optical signal output device (3) is configured to be displaced relative to a housing (10) of the floor treatment apparatus (1) and/or wherein the optical signal output device (3) features an optical deflection arrangement, which is configured to be displaced relative to the housing (10), in order to deflect the optical information signal (2) on the projection site (8).

\* \* \* \* \*